United States Patent [19]

Eromäki

[11] Patent Number: 5,800,644
[45] Date of Patent: Sep. 1, 1998

[54] VEHICLE TIRE THAT CAN BE ELASTICALLY FITTED WITH STUDS

[75] Inventor: Pentti Juhani Eromäki, Nokia, Finland

[73] Assignee: Nokian Renkaat Oy, Nokia, Finland

[21] Appl. No.: 758,910

[22] Filed: Dec. 2, 1996

Related U.S. Application Data

[62] Division of Ser. No. 608,169, Feb. 27, 1996.

[30] Foreign Application Priority Data

Mar. 3, 1995 [FI] Finland ............ 950993

[51] Int. Cl.$^6$ ............................................. B60C 11/16
[52] U.S. Cl. ............................. 152/210; 152/209 R
[58] Field of Search ........................ 152/210, 209 R

[56] References Cited

U.S. PATENT DOCUMENTS

| 1,230,508 | 6/1917 | Peden | 152/210 |
| 2,572,996 | 10/1951 | Dunlap | 152/210 |
| 3,911,986 | 10/1975 | Cantz | 152/210 |

FOREIGN PATENT DOCUMENTS

| 50320 | 6/1976 | Finland . |
| 2036001.6 | 1/1972 | Germany . |
| 2228753.2 | 1/1974 | Germany . |
| 2351803.8 | 4/1975 | Germany . |
| 3122792.9.21 | 6/1981 | Germany . |

*Primary Examiner*—Francis J. Lorin
*Attorney, Agent, or Firm*—Klarquist Sparkman Campbell Leigh & Whinston, LLP

[57] ABSTRACT

A vehicle tire comprising a tire carcass (3) and on top of this a cap (29) consisting of at least one rubber quality and forming the tread (7), the cap having anti-skid stud holes (5) extending from the tread to its inside. At the bottom (8) of the anti-skid stud holes (5) and thus under the bottom flange (21) of the anti-skid studs (20) elastic cushions (6) are provided, made of a material of an elasticity higher than that of the rubber quality forming the said cap (29).

16 Claims, 5 Drawing Sheets

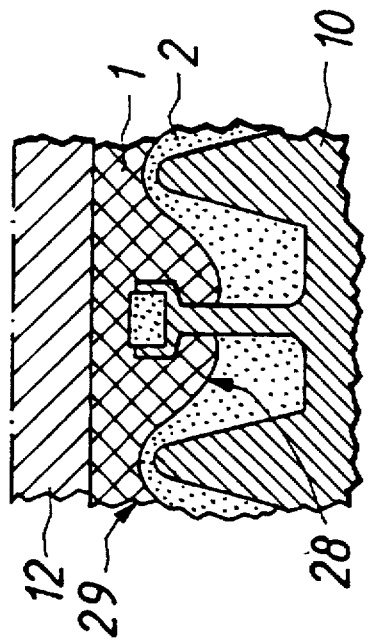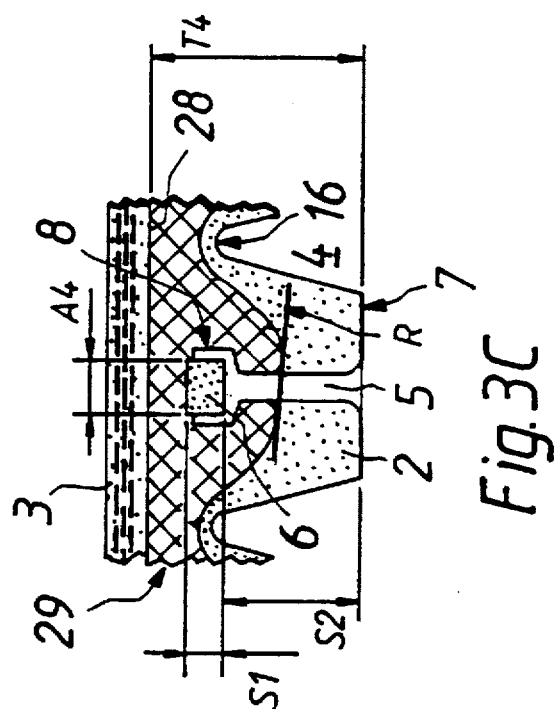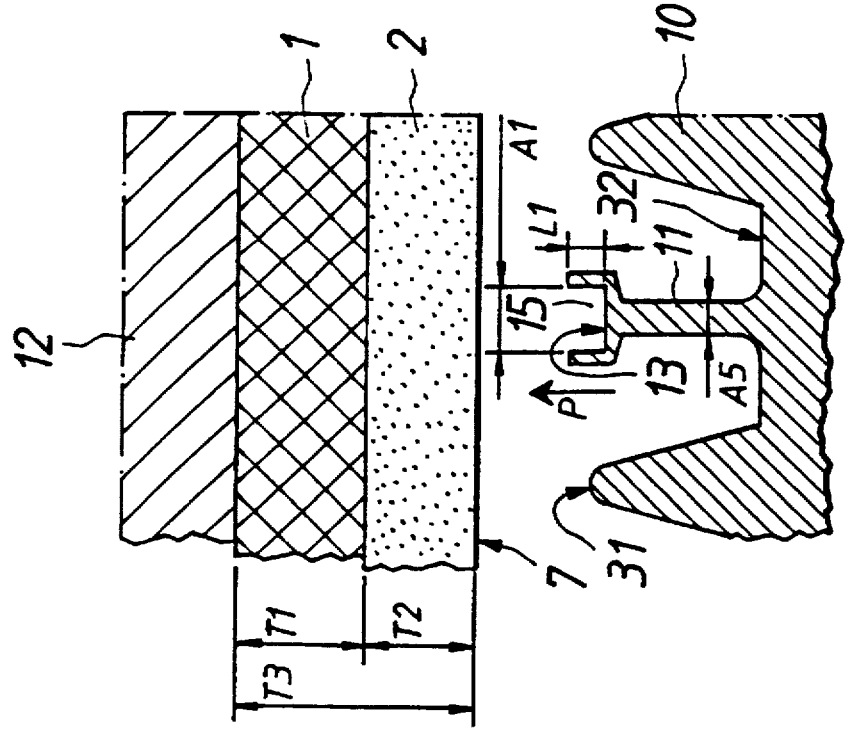

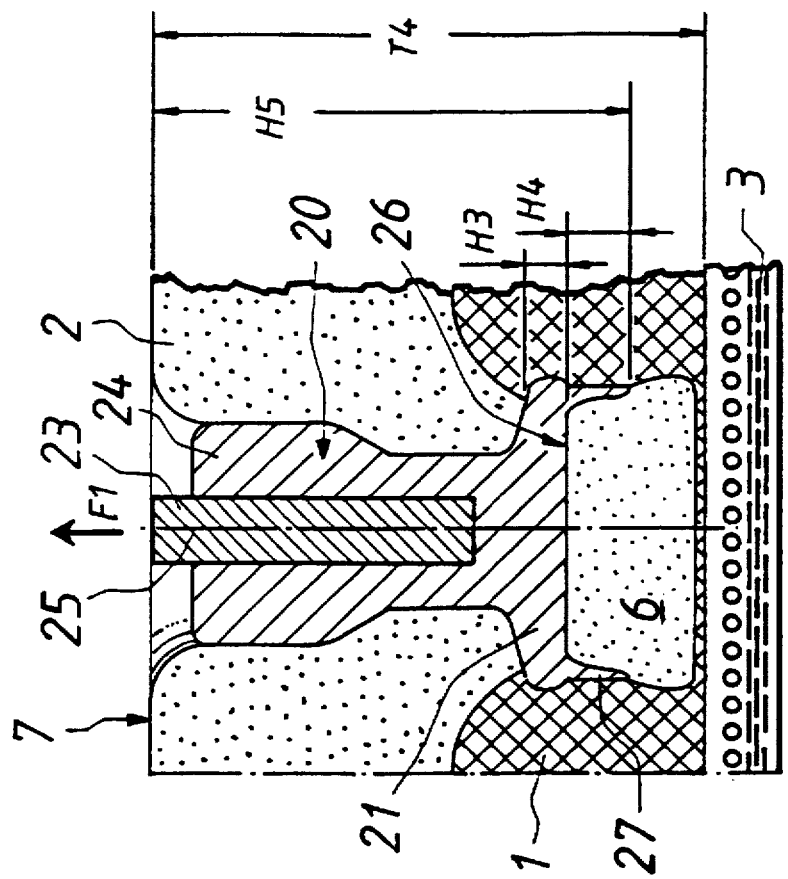
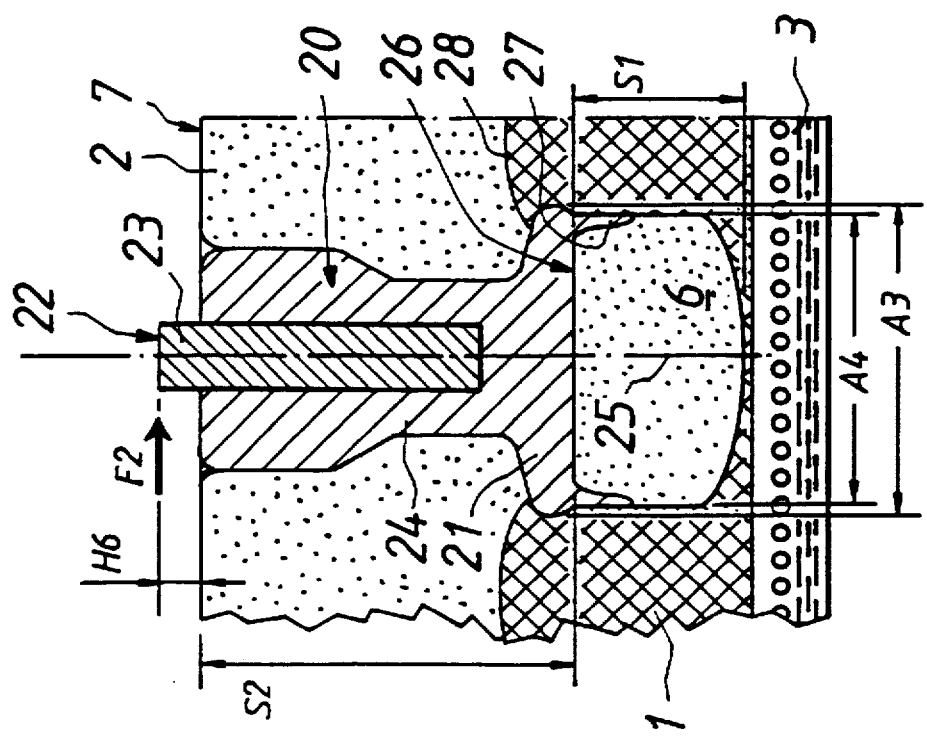

VEHICLE TIRE THAT CAN BE ELASTICALLY FITTED WITH STUDS

This is a division of application Ser. No. 08/608,169, filed Feb. 27, 1996.

The invention relates to a method for providing anti-skid stud holes in the cap of a vehicle tire, the cap consisting of a first harder rubber layer facing the tire carcass and a second rubber layer of more resilient rubber forming the tread, in which the tire surface pattern and the stud holes are pressed with a surface pattern mould from the direction of the tread into the said rubber layers while these are in a plastic state, after which the rubber layer materials are vulcanized to said harder respectively more resilient operating states and the surface pattern mould is removed. The invention also relates to a vehicle tire comprising a tire carcass and on top of this a cap consisting of at least one rubber quality and forming the tread, the cap comprising anti-skid stud holes extending from the tread to its inside. The invention further relates to the anti-skid stud to be used in such a vehicle tire, comprising a shank portion, a hard metal tip and a flat or at least partly concave bottom flange at the end opposite to the tip.

There have lately been various attempts to enhance the grip of winter tires in particular. The grip can be increased with a pattern on the tread of the tire especially with a view to driving on snow. However, in driving on a hard or icy roadway, the properties of the rubber forming the tread and the anti-skid studs fixed to the tread will have a more notable impact. The friction coefficient between the hard and icy road surface and the tread of the tire can be increased with the use of special friction rubber qualities in the tread. Such rubber qualities are very soft, i.e. they have high elasticity and a hardness typically in the range from 55 sh° to 63 sh° A. They are commonly called "cap rubbers". If, however, the rubber layer on top of the tire carcass is throughout formed of such soft cap rubber alone all the way to the tread, the tire will sway too much during driving to be apt for many purposes of use, precisely due to this elasticity. This is why the treads of tires have lately been formed of a combination of such soft cap rubber and a harder rubber layer, the rubber layer composite comprising the two rubber qualities in equal amounts on the average. The harder rubber quality, placed closer to the tire carcass, is commonly called "base rubber", and its hardness is typically in the range from 67 sh° to 72 sh° A. The surface pattern being pressed into such a rubber layer composite, the major part of the height of the surface pattern, i.e. the dimension of the groove depth, will consist of the more elastic cap rubber, whereas the portion between the surface pattern and the carcass and part of the height of the surface pattern will be chiefly of harder base rubber. This design yields a "friction tire", having a high friction coefficient with regard to a hard driving surface, while the roadholding still remains good owing to the harder base rubber layer.

The use of a harder base rubber layer between the surface pattern and the tire carcass, and partly within the surface pattern, entails the same drawbacks as in the case of more conventional tires, in which the cap forming the tread is entirely made of a harder rubber than the cap rubber mentioned above. When such a tire is provided with studs, the bottom flange within the tire tread opposite to the stud tip will be located in this hard rubber, and under the action of this, a relatively great force will be required on a hard roadway to press the tip of the stud to the plane of the tread. This will occur in any case under the weight of the vehicle, but the great penetrating force of the stud will entail considerable wear of the road surface and also tire noise. What is more, this great penetrating force will prevent studs from being placed in the central parts of the tire, where the grip of the stud would otherwise be utilised at maximum. Current regulations explicitly forbid placing studs in the central parts of tires and allow studs to be placed close to the tire shoulder alone, where surface pressure is lower, reducing wear of the road but also impairing the grip of the studs.

In fact, there have been attempts to reduce the penetrating force of anti-skid studs by means of a "bush stud", consisting of a stud body and a stud pin movable within this, with a motion perpendicular to the tread of the tire. This has been based on the idea that during driving on an icy or snowy road, into which the stud can penetrate, sufficient penetrating force is attained with the centrifugal force exerted on the stud pin by the rotation of the tire. In this case, the penetrating force of the stud would consist only of a force equal to this centrifugal force, because the stud pin is freely movable within the stud body. However, maintaining relative motion between the stud body and the stud pin under any circumstances involves considerable problems in such a stud type. Practice has shown that dirt will hamper the motion of the stud pin relatively soon after the tire fitted with studs has been taken into use. Relative control of the stud pin and the stud body entail additional problems. Moreover, attempts to enhance the function have called for an asymmetrical design of the stud relative to its central line, so that the studs must be placed in the tire exactly in specific positions, at higher cost.

The object of the invention is thus to provide a vehicle tire that can be or is fitted with anti-skid studs, in which inserting the studs from the tread inwards until the stud tip reaches the plane of the tread requires considerably less force than insertion of conventional compact studs. The object of the invention is thus to reduce the penetrating force exerted by the anti-skid studs in the tire on the roadway in driving on a hard surface and consequently to reduce road abrasion and tire noise. A second object of the invention is such a vehicle tire to be fitted with studs that have a compact structure, i.e. the anti-skid studs do not include elements movable relative to each other, and thus it is ensured that the studs will function also at the end of the life cycle of the tire and the stud. A third object of the invention is such a vehicle tire, in which the studs may be symmetric with regard to their central line, enabling the studs to be placed in the tire in any position. A fourth object of the invention is such a vehicle tire to be fitted with studs whose manufacturing costs are not at least substantially higher than those of conventional simple studs and involving manufacturing costs of the vehicle tire that are at least not substantially higher than those of any known similar tire.

The drawbacks described above are eliminated and the objects defined above are achieved with the method for manufacturing a vehicle tire in accordance with the invention.

The chief advantage of the invention is that it can be implemented in the manufacture of a vehicle tire that can be elastically fitted with studs, in which the penetrating force of the anti-skid stud remains low owing to the use of various elasticities and designs in the materials, and thus there will be no need for elements movable relative to each other in the anti-skid stud. The method in accordance with the invention has the advantage of allowing the tread pattern and the stud holes of the invention to be formed in the vehicle tire to be elastically fitted with studs with the same process steps as conventional tread patterns and stud holes. Consequently, the manufacturing costs of this vehicle tire elastically fitted with studs are not higher than those of a corresponding conventional tire. The vehicle tire elastically fitted with studs in accordance with the invention reduces the penetrating force to an extent such that studs can be placed even in the central area of the width parallel to the axial line of the tire. This yields a better grip of the tire fitted with studs in accordance with the invention than the grip of a conventional tire fitted with studs, because the anti-skid studs are provided on a larger surface pressure area, but road wear and tire noise will still be lower than with conventional tires fitted with studs, in which studs are provided on the shoulder area of the tire alone, owing to the appreciably lower penetrating force of the anti-skid studs in accordance with the invention. A further advantage of the invention is that it allows quite ordinary anti-skid studs equipped with a bottom flange or anti-skid studs with a design slightly different from these to be used in the vehicle tire to be elastically fitted with studs in accordance with the invention.

The invention will be described in greater detail below with reference to the enclosed drawings.

FIGS. 3A to 3C show steps of the method in accordance with the invention for providing a vehicle tire elastically fitted with studs in a plane perpendicular to the tread of the tire. FIG. 3C is simultaneously a general view of the stud hole area in the vehicle tire elastically fitted with studs in accordance with the invention, whereby the stud hole can be provided not only with the method in FIGS. 3A to 3C but also with the method in FIGS. 4A to 4C and FIG. 5. The figures show how the elastic cushion is produced at the bottom of the stud holes.

Figure 4B:
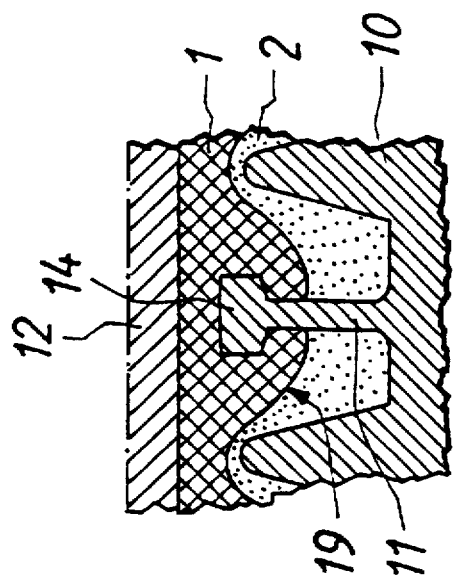
Figure 4C:
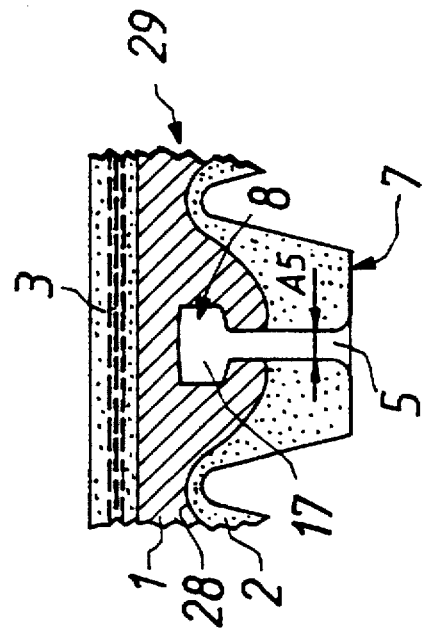
Figure 4A:
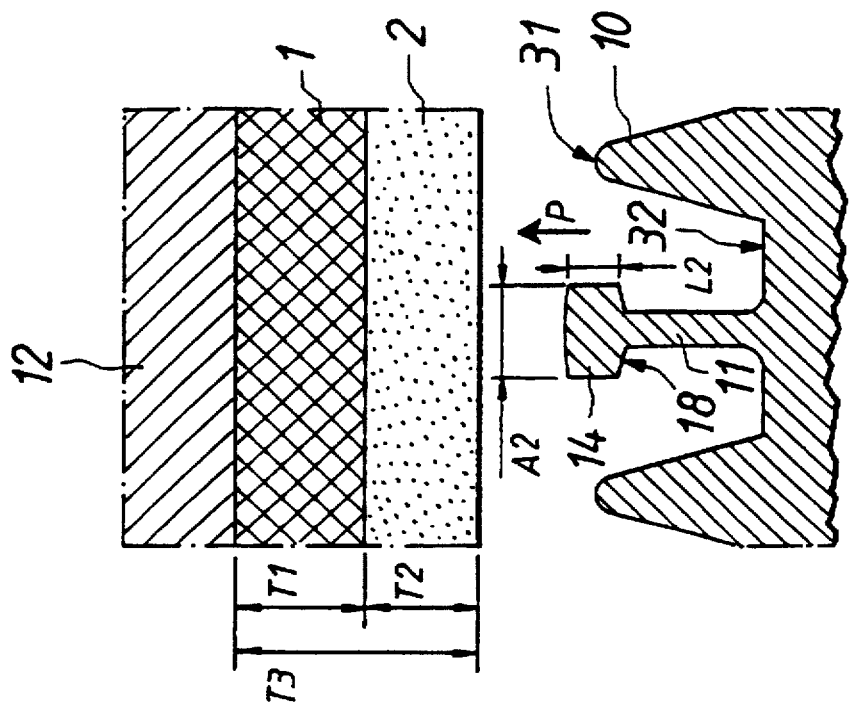

FIGS. 4A to 4C illustrate an optional method in accordance with the invention for providing a tire elastically fitted with studs, these steps forming the first step of the method. The figures show a procedure for providing a bottom cavity at the bottom of the tires fitted with studs and thus a space for the elastic cushion to be produced in consecutive steps.

Figure 5:
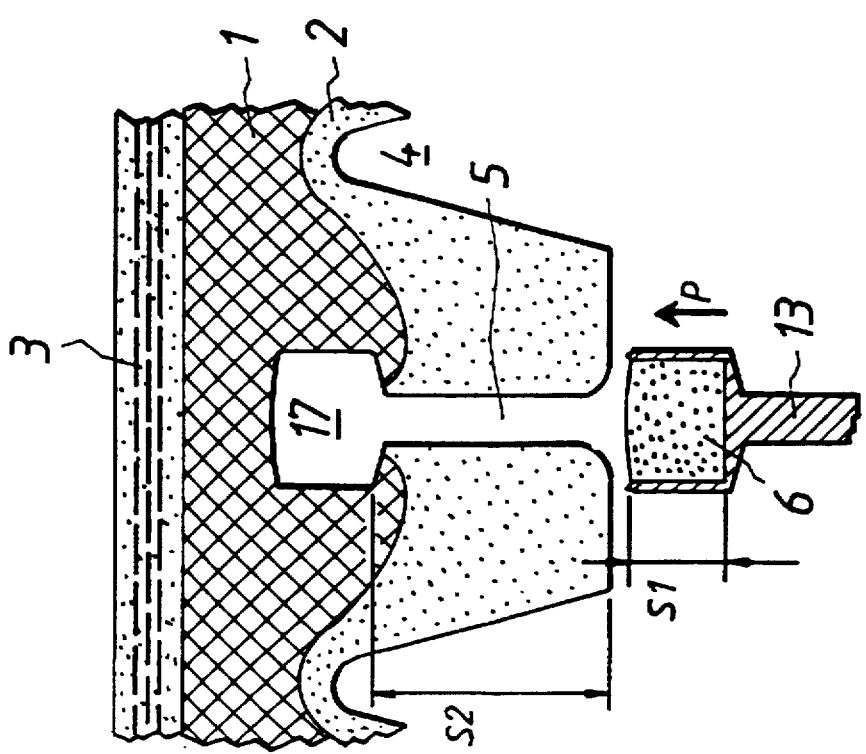

FIG. 5 shows a supplementary step to the steps in FIGS. 4A to 4C, resulting in a tire elastically fitted with studs provided with the stud holes including elastic cushions of FIG. 3C.

Figure 1:
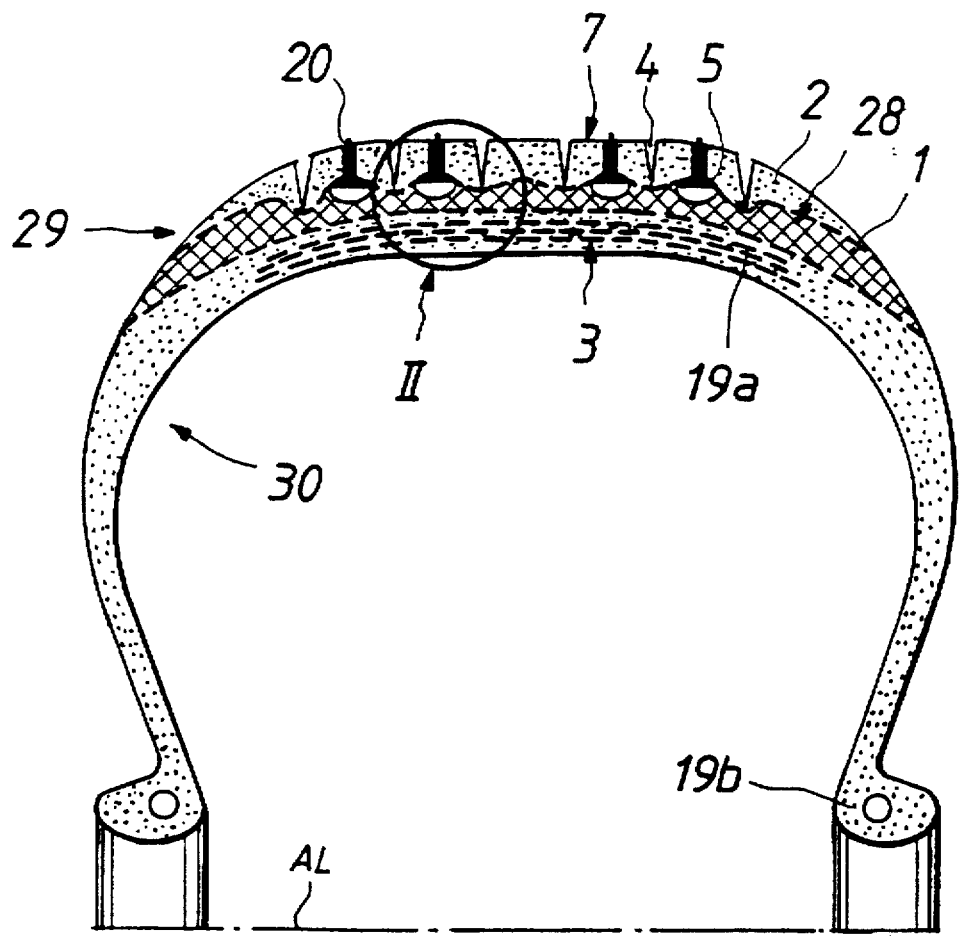
FIG. 1 shows a schematic cross-section of a vehicle tire elastically fitted with studs in accordance with the invention, along a plane through the axial line, the tire being provided with elastic cushions under the anti-skid studs.
Figure 2:
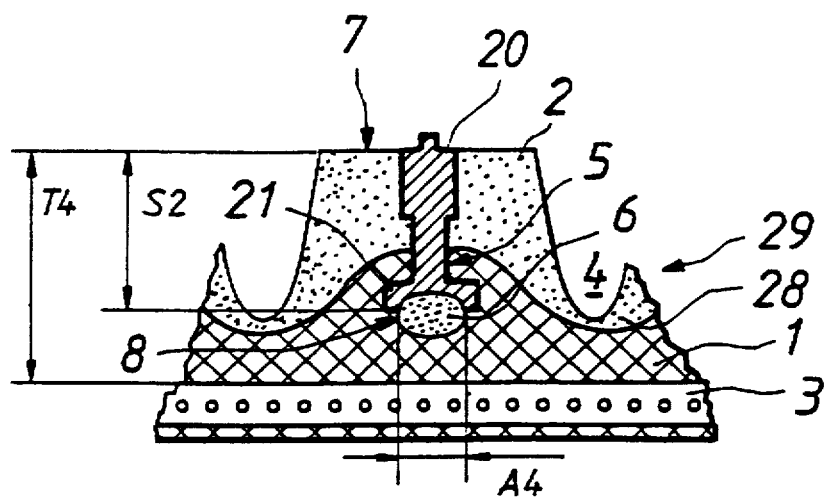
FIG. 2 shows an area of a stud in a vehicle tire elastically fitted with studs in accordance with the invention, taken on a larger scale from area II in FIG. 1. The figure shows the elastic cushion of the invention under the bottom flange of the anti-skid stud within the tire cap.
Figure 6:
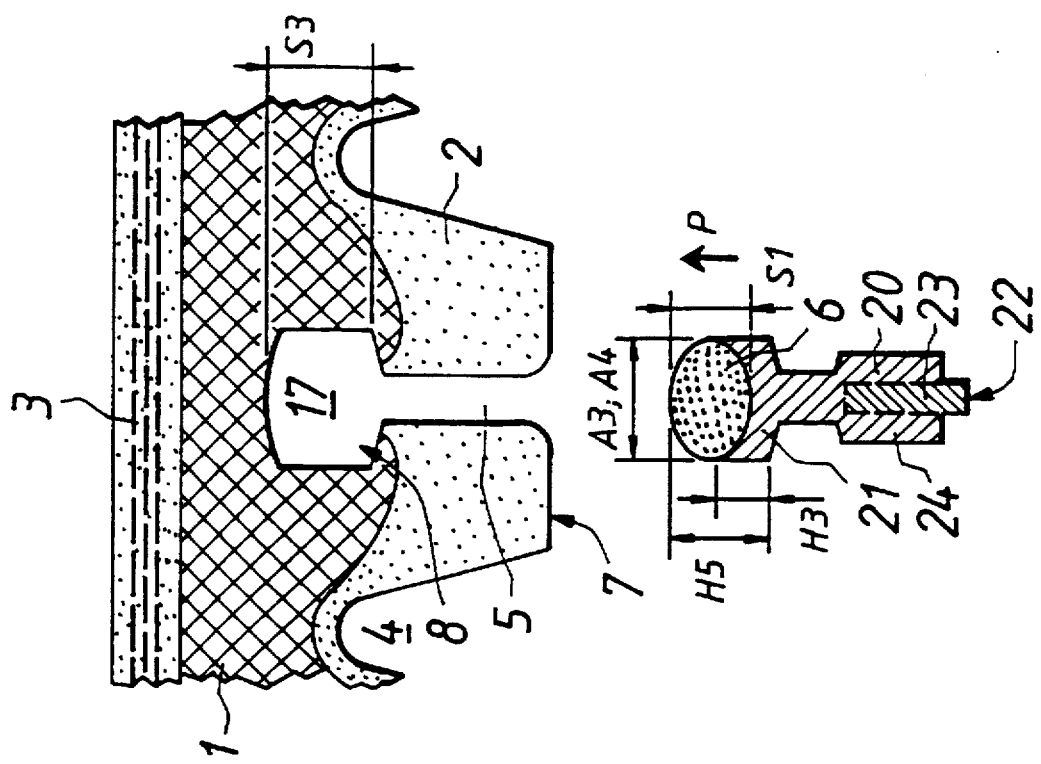

FIG. 6 shows an optional supplementary step to the steps of FIGS. 4A to 4C, in which the stud holes with bottom cavities are provided with anti-skid studs equipped with elastic cushions in order to attain the tire fitted with studs of FIGS. 1 and 2.

FIGS. 7 and 8 illustrate the function of the tire elastically fitted with studs in accordance with the invention and in particular the function of the elastic cushion of the invention, placed under the bottom flange of the anti-skid stud. In the situation illustrated in FIG. 7, the stud is unloaded and in FIG. 8 the stud is pressed against a hard driving surface, the weight of the vehicle exerting force on the stud and pressing its tip to the plane of the tread.

FIGS. 1 and 2 respectively 7 and 8 show a tire 30 elastically fitted with studs in accordance with the invention or respectively one point in such a tire fitted with studs. The tire 30 comprises a carcass 3, including the fabric and rubber imparting shape and density to the tire, a tire belt 19a and a tire shoulder 19b in contact with the rim, not shown in detail in the figures, in this respect the tire may be of any new or known type. On top of this tire carcass 3 is a cap 29 consisting of at least one rubber quality and forming tread 7, the cap comprising anti-skid stud holes 5 extending from tread 7 to the inside. Besides stud holes 5, cap 29 typically also comprises a surface pattern 4, which may also be of any new or known type. The cap 29 forming the tread may conventionally consist of one single relatively hard rubber quality, and in that case a tire of friction type is not being concerned. Optionally the cap 29 forming tread 7 consists of a first harder rubber layer 1 facing the tire carcass 3, i.e. of the base rubber mentioned above, and of a second rubber layer 2 of a more elastic material forming tread 7, i.e. the cap rubber mentioned above. This embodiment, in which cap 29 consists of two different rubber layers 1 and 2, is shown in FIGS. 1 and 2 respectively 7 and 8, but a tire of the type mentioned above, in which cap 29 consists of one single relatively hard rubber quality, can of course be elastically fitted with studs in accordance with the invention. The hardness of such a harder rubber quality is greater than 63 sh° A and typically greater than 65° A. As explained above in this patent application, a cap 29 formed of a softer cap rubber quality alone will not yield a tire fit for driving.

In a first embodiment of the tire 30 in accordance with the invention, illustrated in FIG. 3C, elastic cushions 6 are provided at bottom 8 of the holes 5 for anti-skid studs 20, seen in the direction from tread 7, the cushions being of a more elastic material than that of the rubber quality in the cap 29 mentioned above. Thus, in the situation shown in FIG. 3C, the tire in accordance with the invention is not yet provided with studs, but otherwise finished. When anti-skid stud 20 is inserted in the stud hole 5 shown in FIG. 3C, having an elastic cushion 6 at its bottom, the tire 30 elastically fitted with studs shown in FIGS. 1 and 2 respectively 7 and 8 will be obtained.

A second embodiment of the tire 30 to be elastically fitted with studs in accordance with the invention appears in FIG. 6. In this embodiment, the hole 5 in the tire for the anti-skid stud 20 comprises a bottom cavity 17, having a length S3 in a direction perpendicular to tread 7 which is greater than the thickness H3 of the bottom flange 21 of the stud 20 to be inserted. This stud hole 5 will subsequently accommodate a stud 20 in accordance with the invention as shown in FIG. 6, comprising an elastic cushion 6 at the end of the bottom flange 21 opposite to the stud tip 22. Once the stud 20 has been inserted in position, this elastic cushion 6 will settle in the bottom cavity 17 at the bottom 8 of stud hole 5. In this manner, the tire 30 elastically fitted with studs illustrated in FIGS. 1 and 2 respectively 7 and 8 is also obtained.

Whether the elastic cushion 6 be produced at the bottom 8 of stud holes 5 in the manner described above, as elastic cushions attached to the stud as these are inserted in the tire, or as elastic cushions provided at the bottom 8 of the stud holes 5 before the studs are inserted, the elastic cushion 6 in accordance with the invention has the following features. The surface of the elastic cushion 6 facing the tread 7 is at a mounting depth S2 of the bottom flange 21 of the anti-skid stud types 20 intended for the tire, measured from the tread. This arrangement results in that the bottom flange 21 inserted in the cap 29 of the tire of the anti-skid stud 20 will bear against the elastic cushion 6, which is clearly visible in FIGS. 2 respectively 7 and 8. The diameter A4 of the elastic cushion 6 in the direction of the tread is 50 to 200% of the diameter A3 of the bottom flange 21 of the anti-skid stud types intended for the tire. In other words, the diameter A4 of the elastic cushion 6 may be smaller or greater than the diameter A3 of the bottom flange 21 of the stud 20. This ratio of the diameter of the elastic cushion to the diameter of the bottom flange 21 can be used to set the penetrating force of stud 20. The diameter A4 of the elastic cushion is preferably in the range from 60 to 150% of the diameter A3 of the bottom flange 21. In the embodiment shown in the figures, the diameter of the elastic cushion is in the same range as the diameter A3 of the stud bottom flange 21, however, the invention is obviously not confined to this, as explained above. The thickness S1 of the elastic cushion is at least 3 to 10% and preferably in the range of 15 to 35% of the overall thickness T4 of the rubber cap 29 on top of the carcass 3, i.e. of the space between the tread 7 and the carcass 3, as illustrated in the figures. At the most, the thickness S1 of the elastic cushion 6 is such as to entirely fill up the space between bottom flange 21 of the anti-skid stud 20 and the tire carcass 3, corresponding closely to the embodiment shown in FIGS. 7 and 8. In the embodiment of FIG. 2, the thickness of the elastic cushion 6 is less than this maximum thickness. The thickness of the elastic cushion depends on the length H5 of the stud relative to the overall thickness T4 of the rubber cap 29. See FIG. 8. When minimum penetrating force is desired for anti-skid stud 20, the thickness S1 of the elastic cushion in a direction perpendicular to the tread 7 must be as great as possible, i.e. at least approaching the maximum thickness described above.

In accordance with the invention the elastic cushions 6 are made of a rubber or other elastomer of a hardness less than that of cap 29, when the cap consists of one rubber quality, or of a hardness less than that of its first rubber layer 1, located closer to the tire carcass 3. Thus, the elastic cushions 6 are made of a material having a hardness of not more than 67 sh° A and preferably not more than 65 sh° A. When production techniques explained in detail elsewhere in this patent application and appearing in FIGS. 5 and 6 are being used, the elasticity of the material of the elastic cushions 6 is not subject to any limitations in terms of production techniques, but they may have any hardness, without minimum limits, and thus any elasticity, without maximum limits. However, the hardness of the material of the elastic cushion 6 is typically in the same range as that of a friction tire, i.e. the hardness of the outmost second rubber layer 2 forming tread 7, approximately in the range from 50 sh° to 63 sh° A. When minimum penetrating force is desired for the anti-skid stud, the elastic cushion material must have maximum elasticity and thus minimum hardness. Generally speaking, either cap 29 or respectively the first rubber layer 1 are made of such a rubber or other elastomer that has lower elasticity than the elastic cushion material. Consequently, the hardness of cap 29 and the first rubber layer 1 is greater than 63 sh° A and preferably greater than 65 sh° A. Materials with a hardness in the range of 67 sh° to 75 sh° A are typically used, as explained above in this patent application. As mentioned above, the elasticity of the material of the second rubber layer forming the tread is greater than that of the first rubber layer 1. One option is to make the elastic cushion 6 of the same material as the second rubber layer 2, regardless of the method of manufacturing and fitting the elastic cushion, such as any of the methods described below.

The cap 29 consisting of two rubber layers 1 and 2, at least half of the thickness S1 of the elastic cushion in a direction perpendicular to the tread of the tire is located on the side of the first rubber layer 1 from the interface 28 between the first and second rubber layer. The thickness S1 of the elastic cushion is preferably at least nearly totally on the side of the first rubber layer from the planes R drawn to join the outmost points on the tread side from the interface 28 between the rubber layers. Such a plane R has been drawn in FIG. 3C. This demarcation is due to the fact that, depending on the manufacturing techniques, the interface 28 between the first and the second rubber layer 1, 2 will be more or less undulating, as shown in the figures. When those points on the interface 28 surrounding the stud hole 5 are found at which this interface is closest to the tread 7, and plane R is drawn through these points, the elastic cushions 6 will thus preferably be entirely located on the side of the tire carcass 3 from plane R and at least partly inside the first rubber layer. The elastic cushions 6 may also be placed at a depth in the first rubber layer such that they are entirely on the side of the first rubber layer independently of the undulation of the interface 28. In the embodiments shown in the figures, the surface of the elastic cushions 6 facing the tread 7 is approximately at the interface 28.

The vehicle tire in accordance with the invention described above, comprising elastic cushions 6 at the bottom 8 of stud holes 5, is preferably provided with such anti-skid studs 20 that comprise a flat or at least partly concave bottom flange 21 at the end penetrating the tire cap 29. FIG. 6 shows the anti-skid stud in accordance with the invention provided with a concave bottom flange 21 and an elastic cushion 6, the dimensions and material of the elastic cushion having been described above. FIGS. 7 and 8 show a second preferred design of the bottom flange 21 of the stud in accordance with the invention. The anti-skid stud 20 in FIGS. 7 and 8 is apt to be fitted in stud holes 5 without the elastic cushion fixed to it, the elastic cushions 6 being provided at the bottom of the stud holes. Optionally the anti-skid stud in FIGS. 7 and 8 has an elastic cushion 6 fixed to it, corresponding to the embodiment in FIG. 6. In this case, the embodiments of FIGS. 6 and 7, 8 differ from each other only with regard to the exact shape of the bottom flange. In the embodiment of FIG. 6, the stud has a spherically outwards concave bottom flange, whereas the embodiment in FIGS. 7, 8 comprises a bottom flange provided with edgings 27, but otherwise flat. The special concave shape of the bottom flange 21 in accordance with the invention has thus been produced from an approximately flat flange surface 26 and a cylindrical edge 27 surrounding this and protruding away from the stud tip 22. Thus, this cylindrical edge is at least near the extreme edges of the flange surface 26 and projects towards the tire carcass 3 and thus away from the working tip 22 of the stud. This edge 27 has a height not more than equal to the thickness S1 of the elastic cushion 6 in a direction perpendicular to the tread 7, i.e. parallel to the central line 25 of the stud, when the elastic cushion is not being compressed. The height H4 of the edge is preferably 10 to 60% of the thickness S1 of the elastic cushion in this direction when it not compressed, i.e. in the state it will adopt when the stud 20 is inserted in position but not subject to any other external forces. This situation is illustrated in FIG. 2 and FIG. 7. With the edge height limited as above, it is ensured that the bottom flange 21 of the anti-skid stud does not bear against the hard rubber quality even when the stud is pressed into the cap due a hard driving surface, as shown in FIG. 8.

In other respects, the anti-skid stud in accordance with the invention may have a conventional design, thus containing a shank portion 24 and a hard metal pin 23. However, there is nothing to prevent the flange surface 26 from having any other than a flat shape. It may for instance be outwardly concave or convex or of any other shape. Nonetheless, a generally concave shape and especially the edge of the bottom flange as described help the anti-skid stud and the elastic cushion to remain mutually positioned during the use of the tire, and the stud will then move out of the tire cap in its axial direction 25, as shown in FIG. 7, and penetrate the cap, as shown in FIG. 8.

FIGS. 3A to 3C illustrate a preferred method in accordance with the invention to provide anti-skid stud holes 5 in a vehicle tire in which an elastic cushion 6 is provided at the bottom 8 of the stud hole 5 after the steps of this method have been accomplished. A conventional way of forming surface pattern 4 and stud holes 5 in the cap 29 of the vehicle tire 30 is to press them with a pattern surface mould 10 into the cap material with this in a plastic state. In the conventional procedure this means that the cap 29 material is pressed between the surface pattern mould 10 and a counterpart 12 with the cap in a plastic state, and after this the cap material is vulcanized while remaining between the counterpart and the surface pattern mould. The surface pattern mould is subsequently removed and the cap is placed on top of the tire carcass 3 and is fixed to this by vulcanizing. This is the most common process nowadays. A second option involves pressing stud holes 5 and surface pattern 4 into the cap in plastic state on top of the tire carcass 3, which is an older method. The method in accordance with the invention is applicable to both these manufacturing methods.

The special feature of the first embodiment of the method in accordance with the invention is that the pin 11 of the surface pattern mould 10 producing the anti-skid stud hole 5 comprises a tip recess 15 at its tip portion. In this embodiment the cap 29 comprises a first harder rubber layer 1 facing the tire carcass, i.e. the base rubber layer described above, and a second rubber layer 2 of more resilient rubber forming the tread 7, i.e. the cap rubber layer previously discussed. In accordance with the invention, the surface pattern mould 10 and its pin 11 with its tip recess 15 is brought to the composite consisting of the first and the second rubber layer from the direction of the second rubber layer 2, i.e. the direction P of the future tread 7, so that the tip recess in the pin propels the material of the second rubber layer in front of it with its transverse surface A1, and at least partly into the first rubber layer 1.

FIG. 3A illustrates the initial situation of the method, in which the first and the second rubber layer consist of a cap blank, in which the thickness of the first rubber layer is T1 and the thickness of the second rubber layer is T2 and the overall thickness of the composite is T3. The thickness of the layers of course varies as a function of the tire size, but when a passenger car tire is being concerned, the thickness of the first rubber layer, the base rubber above, is in the range of 2 to 10 mm, and the thickness of the second rubber layer, the cap rubber described above, is in the range of 5 to 8 mm. If a bus or truck tire is being concerned, the layer thicknesses will obviously be greater. When the surface pattern mould 10 is pressed against the counterpart 12 in direction P, with the first and the second rubber layer in a plastic state, some amount of the material of the second rubber layer moves in the tip recess 15 of the pin 11 and in front of this to the side of the first rubber layer. This situation is illustrated in FIG. 3B, where the surface pattern mould is in its end position. After this, surface pattern mould 10 and counterpart 12 are retained in position and a curing step known per se is performed, in which the rubber layer materials are vulcanized and assume their final qualities. After this, the surface pattern mould 10 and the counterpart 12 are removed and the cap 29 is taken on top of the tire carcass, to which it is fixed by vulcanization known per se. This situation is illustrated in FIG. 3C. Here the composite consisting of the first and the second rubber layer forms a cap 29 on top of the tire carcass 3. This cap contains stud holes 5 with elastic cushions 6 provided at their bottom. The diameter A4 and fitting depth S2 and also thickness S1 of the elastic cushions are the same as explained above in this patent application. Consequently, it is understandable that the stud holes in accordance with the invention, with elastic cushions 6 at their bottom 8, have been achieved by implementing conventional tire manufacturing steps but by using pins 11 provided with tip recesses 15 in the surface pattern mould 10 in accordance with the invention. In other words, these manufacturing techniques are apt for use in the manufacture of tires 30 in which the cap 29 consists of a harder first rubber layer 1 facing the tire carcass and a second rubber layer 2 forming the tread, made of a harder rubber than the first rubber layer.

In order to provide the desired size for cushion 6, the tip recess in pin 11 is thus open in the direction P in which the pin 11 is moved when being brought to the rubber layer composite 1, 2. The diameter of the the tip recess is typically in the range of 50 to 200% and preferably approximately 60 to 150% of diameter A3 of bottom flange 21 of the anti-skid stud types intended for use in tire 30. In the embodiment of FIGS. 3A to 3C the diameter A1 of the tip recess is of the same order as the diameter A3 of the bottom flange 21 of the studs to be used. In order to obtain the desired thickness S1 for the elastic cushion 6, the depth L1 of the tip recess is at least 5% and preferably at least 10 to 30% of the overall thickness T3 of the rubber layer composite before the surface pattern and the stud holes are formed. The pin 11 of the surface pattern mould is pressed into the rubber layer composite to a depth such that the bottom 13 of the tip recess 15 is at the mounting depth S2 of the flange 21 of the anti-skid stud 20 to be inserted in the tire, measured from the tread. This depth is typically in the area of the height of the bottom 16 of the surface pattern 4 or deeper. This means that in the surface pattern mould 10, the bottom 13 of the tip recess is either aligned with the crests 31 of the ridges forming grooves 4 in the surface pattern, or not more than 15% from this point, calculated on the height between the crests 31 and bottoms 32 of the surface pattern mould, towards the bottom 32 of the recesses forming the tread 7, or from this point in a direction away from the bottoms 32 of the recesses.

If the tip recess 15 is given a sufficient depth L1, i.e. the edges of the tip recess are made to extend far enough away from the bottoms 32 of the recesses in the surface pattern mould forming the tread 7, the edges of the tip recess will extend all the way to the counterpart 12 in the extreme case, and thus an elastic cushion will be provided in the finished tire which extends up to its carcass 3, in other words an elastic cushion 6 with maximum thickness. With the tip recess configuration described above, an elastic cushion of the size and located at the point as defined above in this patent application will be provided at the bottom 8 of the stud holes 5. The cross-section of the tip recess in the pin 11 and the outer surface of the pin 1 at the tip recess may be given any adequate shape. Thus the pin and the tip recess may have nearly cylindrical type shown in the figures, and also a conical or similar shape. In the conical shape, the point of the cones points at the bottom 32 of the recesses in the surface pattern mould and the cones open up in the direction of motion P of the surface pattern mould.

A second embodiment of the method in accordance with the invention is shown in FIGS. 4A to 4C and optional additional steps of this are shown in FIG. 5 respectively FIG. 6. In this embodiment, the pin 11 of the surface pattern mould 10 is equipped with a tip expansion 14, whose length L2 in a direction perpendicular to the tread is essentially greater than the thickness H3 of the bottom flange 21 of the anti-skid stud 20 to be used. This tip expansion 14 is brought in a direction P perpendicular to the tread 7 at least partly inside the first rubber layer 1. In this manner, a bottom cavity 17 is provided for the elastic cushion 6 in the stud hole 5. FIG. 4A illustrates the initial situation, in which the composite consisting of the first rubber layer 1 and the second rubber layer 2 is on top of the counterpart 12 and the surface pattern mould 10 is facing the second rubber layer and its movement in direction P has started. In FIG. 4B the surface pattern mould has been pressed into its final position, having then moulded the surface pattern 4 of the tread and the stud holes 5. At this stage, the counterpart and the surface pattern mould are retained in position while the rubber layers are being cured so as to be vulcanized to their final operating states. FIG. 4C shows a situation, in which the counterpart and the surface pattern mould have been removed and the cap 29 has been placed in the tire carcass 3 and fixed to it by vulcanization. In this situation the bottom cavity 17 of the stud hole 5 is visible.

The elastic cushion 6 can be subsequently fitted in the bottom part 8 of the bottom cavity 17 of the stud hole in a separate process step, as illustrated in FIGS. 5 and 6. In the embodiment of FIG. 5, the tool 13 inserts the elastic cushion 6 along the stud hole 5 into the cavity 17, resulting in a tire provided with an elastic cushion approximately as in FIG. 3C once the tool 13 has been removed. Optionally, the stud hole having a bottom cavity 17 can be filled in the manner shown in FIG. 6 and provided with the stud 20 having an elastic cushion 6 as described above in this patent application.

In order to obtain a bottom cavity 17 of sufficient size, the diameter A2 of the tip expansion is in the range of 50 to 200% and preferably of 60 to 150% of the diameter A3 of the bottom flange 21 of the anti-skid stud types intended for use in the tire. In the illustrated embodiment, the diameter A2 of the tip expansions 14 is in the same range as the diameter A3 of the bottom flange 21 of the studs. The length L2 of the tip expansion is at least 5% and preferably at least 10 to 30% of the overall thickness T3 of the rubber layer composite before the surface pattern is formed, in order to provide sufficient space for the elastic cushion 6 at the bottom of the stud hole. In this case also, the pin 11 of the surface pattern mould 10 is pressed into the rubber layer composite to a depth such that the edge 18 of the tip expansion facing the tread 7 will settle approximately at the mounting depth S2 of the bottom flange 21 of the anti-skid stud to be inserted in the tire, calculated from the tread 7. This depth is typically approximately in the area of the height of the bottom 16 of the surface pattern 4 or deeper. This means that in the surface pattern mould 10, the said edge 18 of the tip expansion 14 is either aligned with the crests 31 of the ridges forming the grooves 4 in the surface pattern, or not more than 15% from this point, calculated on the height between the crests 31 and the bottoms 32 of the surface pattern mould, towards the bottom 32 of the recesses forming the tread 7, or from this point in a direction away from the recess bottoms 32. In this case also, the separate elastic cushions 6 to be fitted as in FIG. 5 and also the elastic cushions 6 to be fitted along with the stud as in FIG. 6 are of the same size and material as explained above in this patent application.

Whether the pin 11 of the surface pattern mould equipped with the tip recess 15 as in FIGS. 3A to 3C, or the pin 11 of the surface pattern mould equipped with tip expansion 14 as in FIGS. 4A to 4C, and ultimately e.g. the elastic cushion to be fitted as in FIGS. 5 or 6, are being used, the pin 11 of the pattern mould is inserted into the rubber layer composite to a depth calculated from the tread 7 such that the bottom 13 of the tip recess or accordingly the said edge 18 of the tip expansion 4 will settle preferably in the area of the interface 28 between the first and the second rubber layer, or optionally entirely within the first rubber layer. In that case, the surface of the elastic cushion 6 pointing at the tread 7 will settle relative to the interface 28 between the first and the second rubber layer 1, 2 in the manner explained above in this patent application. If separate elastic cushions 6 are inserted in the stud holes 5 as in FIG. 5, their thickness S1 is not more than equal to the length S3 of the bottom cavities 17, or if tires equipped with stud holes 5 having such bottom cavities 17 are provided with studs having an elastic cushion on the surface of the bottom flange 21 as in FIG. 6, the thickness S1 of this elastic cushion is not more than equal to the length S3 of the bottom cavities 17. Regardless of the method of producing the elastic cushion at the bottom 8 of the anti-skid stud hole 5, the stud inserted on top of this in the stud hole in a direction P perpendicular to the tread 7 preferably consists of studs 20, having, at the end to be fitted inside the rubber layer composite, a flat, concave or preferably cup-like bottom flange 21 which bears against the said elastic cushion.

In the stud holes 5 in accordance with the invention, the diameter A5 of their outmost portion is essentially smaller than the diameter A4 of the bottom cavity and thus of the elastic cushion. The diameter A5 of the outmost portion of the stud hole is typically not more than 90% of the diameter A4 of the elastic cushion, but in most cases it is not more than approx. 70% of the diameter of the elastic cushion, although smaller values occur, depending on the thickness and shape of the shank portion 24 of the anti-skid stud intended for use in the tire.

FIGS. 7 and 8 illustrate the function of the elastically fitted stud in accordance with the invention. In the situation in FIG. 7, the stud 20 is not in contact with the roadway, or it is in contact with a relatively soft road surface, such as an icy or snowy road surface. In this case, the stud has a projection H6, enabling the stud and the tire to receive forces F2 parallel to the tire tread 7 and thus preventing skidding of the tire 30. This stud projection H6 is allowed by the elastic cushion 6 in accordance with the invention, which is in an expanded state in this situation. In FIG. 8 this point of the tire is being pressed against the hard road surface, the elastic cushion 6 being compressed, because the tip 22 of the stud 20 is inserted to the plane of the tread 7 under the weight of the vehicle. This generates a penetrating force F1 against the road, brought about by the springback factor generated by compression. Nonetheless, this penetrating force is appreciably smaller than the penetrating force generated by a similar stud without the elastic cushion 6, with this area consisting of the harder material of the first rubber layer 1, as is readily understood. Thus, when necessary, the elastic cushion 6 in accordance with the invention provides a grip for the studs as in FIG. 7, and if needed, minimum penetrating force as in FIG. 8.

We particularly wish to emphasize that the elastic cushion 6 may be of any appropriate material having higher elasticity than that of the first rubber layer 1, or, if the cap 29 is made up of a single rubber layer, higher than the elasticity of this rubber layer. Generally speaking, the elasticity of the elastic cushion material in accordance with the invention is higher than that of the rubber layer material into which the elastic cushion settles in the finished tire 30, in other words, the hardness of the elastic cushion is less than that of the rubber quality with which the side of the elastic cushion facing away from the tread will be in contact. This definition also applies to tires whose cap 29 is made up of more than two rubber layers. The bottom flange 21 of the stud 20 and also the stud itself may have various designs, yet it is essential that an elastic cushion of sufficient size is provided under the stud, viewed from the direction of the tire tread 7. Also, the method for manufacturing such an elastic cushion for a vehicle tire may vary considerably, and also differ from what has been described above. Thus, separate elastic cushions may be incorporated in the cap during manufacture also from the side of the counterpart 12, yet it is presumably most advantageous to implement the methods described above, providing the elastic cushion with the aid of the design and use of the pin 11 in the surface pattern mould, or by providing the tire with anti-skid studs equipped with an elastic cushion.

I claim:

1. A vehicle tire comprising:

a tire carcass (3);

a cap (29) on top of the carcass (3), the cap (29) comprising a first layer (1) of rubber next to the carcass (3) and a second layer (2) of rubber on top of the layer (1), the rubber of the first layer (1) being harder than the rubber of the second layer (2), the second layer (2) forming a tread (7) for the tire;

at least one anti-skid stud hole (5) disposed in the cap (29), the anti-skid stud hole (5) extending from the exterior of the tread interiorly of the cap (29) into the first layer (1); and a cushion (6) disposed at the interior end of the anti-skid stud hole (5), the cushion (6) being at least partly embedded in the rubber of the first layer (1), the cushion (6) comprising material having an elasticity greater than that of the rubber of the first layer (1), the anti-skid stud hole (5) being adapted to receive an anti-skid stud (20) of the type having a bottom flange (21) and wherein the flange (21) bears against the cushion (6).

2. The vehicle tire of claim 1, wherein the rubber of the first layer (1) has a hardness between 67 sh° and 75 sh° A and the material comprising the cushion (6) comprises a rubber having a hardness less than 67 sh° A.

3. The vehicle tire of claim 1, wherein the rubber of the first layer (1) has a hardness greater than 65 sh° A and the material comprising the cushion (6) comprises a rubber having a hardness less than 65 sh° A.

4. The vehicle tire of claim 1, wherein the rubber of the first layer (1) has a hardness greater than 63 sh° A and the material comprising the cushion (6) comprises a rubber having a hardness between 50 sh° and 63 sh° A.

5. The vehicle tire of claim 1, wherein the cushion (6) is disposed entirely within the rubber of the first layer (1).

6. The vehicle tire of claim 1, wherein the cushion (6) has a thickness (S1) in a direction perpendicular to the tread (7), the cushion (6) being disposed within the rubber of the first layer (1) to a depth of at least one-half of the thickness (S1).

7. The vehicle tire of claim 1, wherein the first and second layers (1,2) provide an interface (28) and the outermost points of the first layer (i) on the interface (28) define a surface (R), the cushion (6) being disposed within the rubber of the first layer (1) interiorly of the surface (R).

8. The vehicle tire of claim 1, wherein the cushion (6) comprises the same material as the rubber of the second layer (2).

9. The vehicle tire of claim 1, wherein the cushion (6) has a thickness (S1) in a direction perpendicular to the tread (7), the tire further comprising an anti-skid stud (20) disposed in the anti-skid stud hole (5), the stud (20) comprising a concave bottom flange (21), the flange (21) comprising a round generally flat flange surface (26) having a cylindrical edge (27), the edge (27) protruding interiorly of the tire cap (29), the edge (27) having a height (H4), and wherein the height (H4) of the edge (27) is less than the thickness (S1) of the cushion (6) when the cushion (6) is not compressed.

10. The vehicle tire of claim 9, wherein the height (H4) of the cylindrical edge (27) is between 10% and 60% of the thickness (S1) of the cushion (6) when the cushion (6) is not compressed.

11. The vehicle tire of claim 1, further comprising an anti-skid stud (20) disposed in the anti-skid stud hole (5), the stud (20) comprising an inwardly disposed generally concave bottom flange (21) and an elastic cushion (6) attached to the inwardly disposed surface of the flange (21).

12. The vehicle tire of claim 1, further comprising an anti-skid stud (20) disposed in the anti-skid stud hole (5), the stud (20) comprising an inwardly disposed, round generally concave bottom flange (21) disposed at a depth (S2) measured from the surface of the tread (7), the cushion (6) being disposed at the depth (S2).

13. The vehicle tire of claim 12, wherein the flange (21) has a diameter (A3) and the cushion (6) has a diameter (A4) in the direction of the tread (7), and the diameter (A4) of the cushion (6) is between 500 and 200% of the diameter (A3) of the flange (21).

14. The vehicle tire of claim 13, wherein the diameter (A4) of the cushion (6) is between 70% and 150% of the diameter (A3) of the flange (21).

15. The vehicle tire of claim 1, wherein the cushion (6) has a thickness (S1) and the cap (29) has an overall thickness (T4) in the direction perpendicular to the tread (7), and the thickness (S1) of the cushion (6) is not less than between 3% and 10% of the overall thickness (T4) of the cap (29).

16. The vehicle tire of claim 15, wherein the thickness (S1) of the cushion (6) is between 15% and 35% of the overall thickness (T4) of the cap (29).

* * * * *

UNITED STATES PATENT AND TRADEMARK OFFICE
CERTIFICATE OF CORRECTION

PATENT NO. : 5,800,644
DATED : September 1, 1998
INVENTOR(S) : Pentti Juhani Eromaki It is certified that error appears in the above-indentified patent and that said Letters Patent is hereby corrected as shown below:

Column 8, line 51, "pin 1" should be --pin 11--.

Column 12, line 3, "layer (i)" should be --layer (1)--;

Column 12, line 39, "between 500" should be --between 50%--.

Signed and Sealed this

Sixteenth Day of November, 1999

Attest:

Q. TODD DICKINSON

*Attesting Officer*    *Acting Commissioner of Patents and Trademarks*